United States Patent
Nakano

(10) Patent No.: US 8,472,970 B2
(45) Date of Patent: Jun. 25, 2013

(54) RADIO COMMUNICATION SYSTEM, RADIO TERMINAL, RADIO BASE STATION, AND INFORMATION COLLECTION METHOD

(75) Inventor: Shinji Nakano, Yokohama (JP)

(73) Assignee: Kyocera Corporation (JP)

( * ) Notice: Subject to any disclaimer, the term of this patent is extended or adjusted under 35 U.S.C. 154(b) by 0 days.

(21) Appl. No.: 13/510,534

(22) PCT Filed: Nov. 17, 2010

(86) PCT No.: PCT/JP2010/070499
§ 371 (c)(1),
(2), (4) Date: May 17, 2012

(87) PCT Pub. No.: WO2011/062196
PCT Pub. Date: May 26, 2011

(65) Prior Publication Data
US 2012/0231813 A1    Sep. 13, 2012

(30) Foreign Application Priority Data
Nov. 17, 2009  (JP) .................................. 2009-262380

(51) Int. Cl.
*H04W 72/00*    (2009.01)
(52) U.S. Cl.
USPC ...................................................... 455/452.2
(58) Field of Classification Search
USPC ............. 455/404.2, 432.1–453, 456.1–456.3, 455/457
See application file for complete search history.

(56) References Cited

U.S. PATENT DOCUMENTS

| | | | |
|---|---|---|---|
| 6,522,888 B1* | 2/2003 | Garceran et al. | 455/456.3 |
| 6,711,408 B1* | 3/2004 | Raith | 455/440 |
| 6,731,931 B1* | 5/2004 | Grayson et al. | 455/430 |
| 6,885,866 B1* | 4/2005 | Wikstedt et al. | 455/436 |
| 7,302,276 B2* | 11/2007 | Bernhardsson et al. | 455/522 |
| 2001/0053139 A1* | 12/2001 | Zimmermann et al. | 370/332 |
| 2007/0041330 A1 | 2/2007 | Bostica et al. | |
| 2007/0053288 A1* | 3/2007 | Stern-Berkowitz et al. | 370/229 |
| 2008/0320526 A1* | 12/2008 | Franceschini et al. | 725/62 |
| 2010/0211912 A1* | 8/2010 | Williams | 715/810 |
| 2011/0003543 A1* | 1/2011 | Laufer | 455/3.02 |
| 2011/0143654 A1* | 6/2011 | Mukhija | 455/9 |

FOREIGN PATENT DOCUMENTS

| | | |
|---|---|---|
| JP | 2000-295165 A | 10/2000 |
| JP | 2007-528618 A | 10/2007 |
| JP | 2008-022065 A | 1/2008 |

OTHER PUBLICATIONS

International Search Report; PCT/JP2010/070499; Dec. 21, 2010.

\* cited by examiner

*Primary Examiner* — Dai A Phuong
(74) *Attorney, Agent, or Firm* — Studebaker & Brackett PC

(57) ABSTRACT

Disclosed is a radio communication system provided with an information collection apparatus (300) for collecting: location information which indicates the location of a radio terminal (100*a*); downlink radio quality information which indicates a measurement result for the radio quality of the downlink between the radio terminal (100*a*) and a radio base station (200*a*); and uplink radio quality information which indicates a measurement result for the radio quality of the uplink between the radio terminal (100*a*) and the radio base station (200*a*). The radio terminal (100*a*) measures the radio quality of the downlink when an outgoing call is made therefrom. The radio base station (200*a*) measures the radio quality of the uplink when the radio terminal (100*a*) makes an outgoing call.

4 Claims, 5 Drawing Sheets

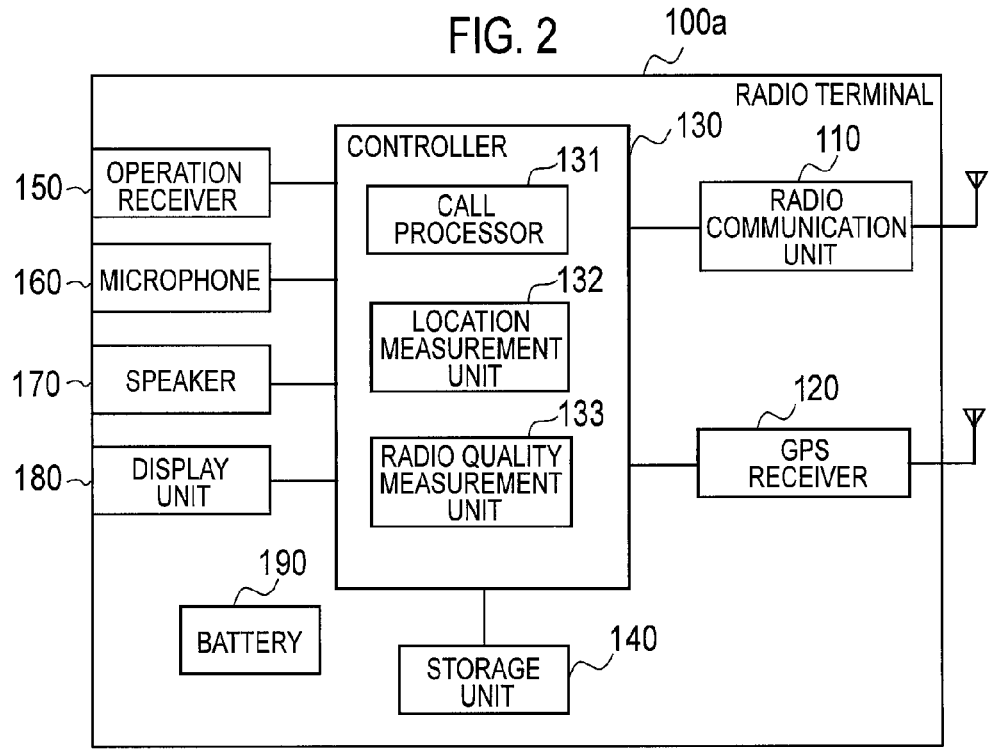
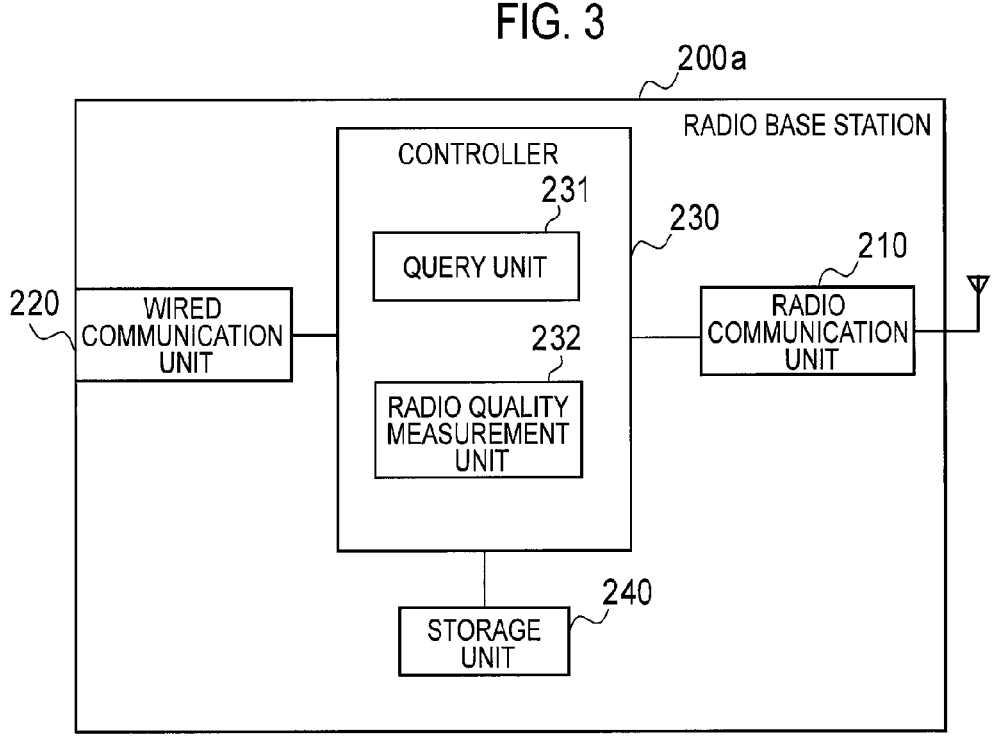

RADIO COMMUNICATION SYSTEM, RADIO TERMINAL, RADIO BASE STATION, AND INFORMATION COLLECTION METHOD

TECHNICAL FIELD

The present invention relates to a radio communication system, a radio terminal, a radio base station, and an information collection method for collecting location information indicating a location in a target measurement area, and radio quality information indicating a radio quality at the location.

BACKGROUND ART

It has been a conventional practice in radio communication systems to collect location information indicating a location in a target measurement area and radio quality information indicating a radio quality (received signal strength, for example) at the location by using manpower and thereby figure out a blind zone and a low electric field zone in the target measurement area. For example, measurement staffs transport equipment for measuring radio qualities and equipment for measuring locations (such as a GPS) by using measurement vehicles and collect the location information and the radio quality information.

Problems with the above collection method using measurement staffs are enormous cost required for the equipment, and also huge labor cost and a large number of man-hours for the measurement staffs. For this reason, a method to solve these problems by automating the collection work has been proposed (refer to Patent Document 1, for example). To put it specifically, end user radio terminals are used to measure the locations and the radio qualities in the measurement target area, and an information collection apparatus provided to a network side collects the measurement results.

PRIOR ART DOCUMENT

Patent Document
PATENT DOCUMENT 1: Japanese Patent Application Publication No. 2008-22065

SUMMARY OF THE INVENTION

The collection method using end user radio terminals, however, does not guarantee that the measurement of radio qualities is performed under ideal measurement conditions. For example, a radio quality measured by using a radio terminal that is stowed in a bag is lower than a radio quality to be measured normally.

Accordingly, the collection method using end user radio terminals has a problem that it is difficult to collect accurate radio quality information.

In this respect, an objective of the present invention is to provide a radio communication system, a radio terminal, a radio base station, and an information collection method each of which enables collection of accurate radio quality information even in a case where end user radio terminals are used.

The present invention has the following features to solve the problems described above. First of all, a first feature of the present invention is summarized as follows. A radio communication system comprises: a radio terminal (e.g. radio terminal 100a); a radio base station (e.g. radio base station 200a) configured to perform radio communications with the radio terminal; and an information collection apparatus (information collection apparatus 300) configured to collect location information indicating a location of the radio terminal, downlink radio quality information indicating a measurement result of a downlink radio quality between the radio terminal and the radio base station, and uplink radio quality information indicating a measurement result of an uplink radio quality between the radio terminal and the radio base station, wherein the radio terminal measures the downlink radio quality when the radio terminal makes an outgoing call, and the radio base station measures the uplink radio quality when the radio terminal makes the outgoing call.

According to the above aspect, each of the downlink and uplink radio qualities is measured when an outgoing call is made. Thus, it is possible to avoid measuring the radio quality under a situation where the radio terminal is stowed in a bag and also to guarantee that the radio quality is measured under ideal measurement conditions. Accordingly, accurate radio quality information can be collected even in a case where end user radio terminals are used.

A second feature of the present invention relates to the first feature of the present invention and is summarized as follows. The radio terminal measures the downlink radio quality during call connection processing executed along with the outgoing call, and the radio base station measures the uplink radio quality during the call connection processing.

A third feature of the present invention is summarized as follows. A radio terminal (e.g. radio terminal 100a) configured to perform radio communications with a radio base station (e.g. radio base station 200a), comprises: a call processor (call processor 131) configured to make an outgoing call; a terminal side measurement unit (location measurement unit 132, radio quality measurement unit 133) configured to measure a downlink radio quality between the radio terminal and the radio base station, and a location of the radio terminal; and a terminal side transmitter (radio communication unit 110) configured to transmit location information indicating the measured location, and downlink radio quality information indicating the measured downlink radio quality to the radio base station, wherein the terminal side measurement unit measures the downlink radio quality when the call processor makes the outgoing call.

A fourth feature of the present invention is summarized as follows. A radio base station (e.g. radio base station 200a) configured to perform radio communications with a radio terminal (e.g. radio terminal 100a), comprises: a base station side measurement unit (radio quality measurement unit 231) configured to measure an uplink radio quality between the radio base station and the radio terminal; a base station side receiver (radio communication unit 210) configured to receive, from the radio terminal, location information indicating a location of the radio terminal, and downlink radio quality information indicating a downlink radio quality measured by the radio terminal; and a base station side transmitter (wired communication unit 220) configured to transmit uplink radio quality information indicating the uplink radio quality measured by the base station side measurement unit, the location information, and the downlink radio quality information to an information collection apparatus, wherein the base station side measurement unit measures the uplink radio quality when the radio terminal makes an outgoing call.

A fifth feature of the present invention is summarized as follows. An information collection method comprises: making an outgoing call by a radio terminal; measuring a downlink radio quality between the radio terminal and a radio base station by the radio terminal when the radio terminal makes the outgoing call; measuring an uplink radio quality between the radio base station and the radio terminal by the radio base station when the radio terminal makes the outgoing call; and collecting by an information collection apparatus, location information indicating a location of the radio terminal, downlink radio quality information indicating a measurement result of the downlink radio quality, and uplink radio quality information indicating a measurement result of the uplink radio quality.

According to the present invention, it is possible to provide a radio communication system, a radio terminal, a radio base station, and an information collection method each of which enables collection of accurate radio quality information even in a case where end user radio terminals are used.

BRIEF DESCRIPTION OF THE DRAWINGS

FIG. 2 is a block diagram showing a configuration of a radio terminal according to the embodiment of the present invention.

FIG. 3 is a block diagram showing a configuration of a radio base station according to the embodiment of the present invention.

DESCRIPTION OF THE EMBODIMENT

Next, an embodiment of the present invention will be described with reference to the drawings. To put it specifically, a description will be given of (1) Configuration of Radio Communication System, (2) Operation of Radio Communication System, (3) Effects of Embodiment, and (4) Other Embodiments. Note that, in the following description of the drawings of the embodiment below, same or similar reference signs denote same or similar portions.

(1) Configuration of Radio Communication System

First, a description will be given of a configuration of a radio communication system according to the embodiment.

(1.1) Schematic Configuration of Radio Communication System

Figure 1:
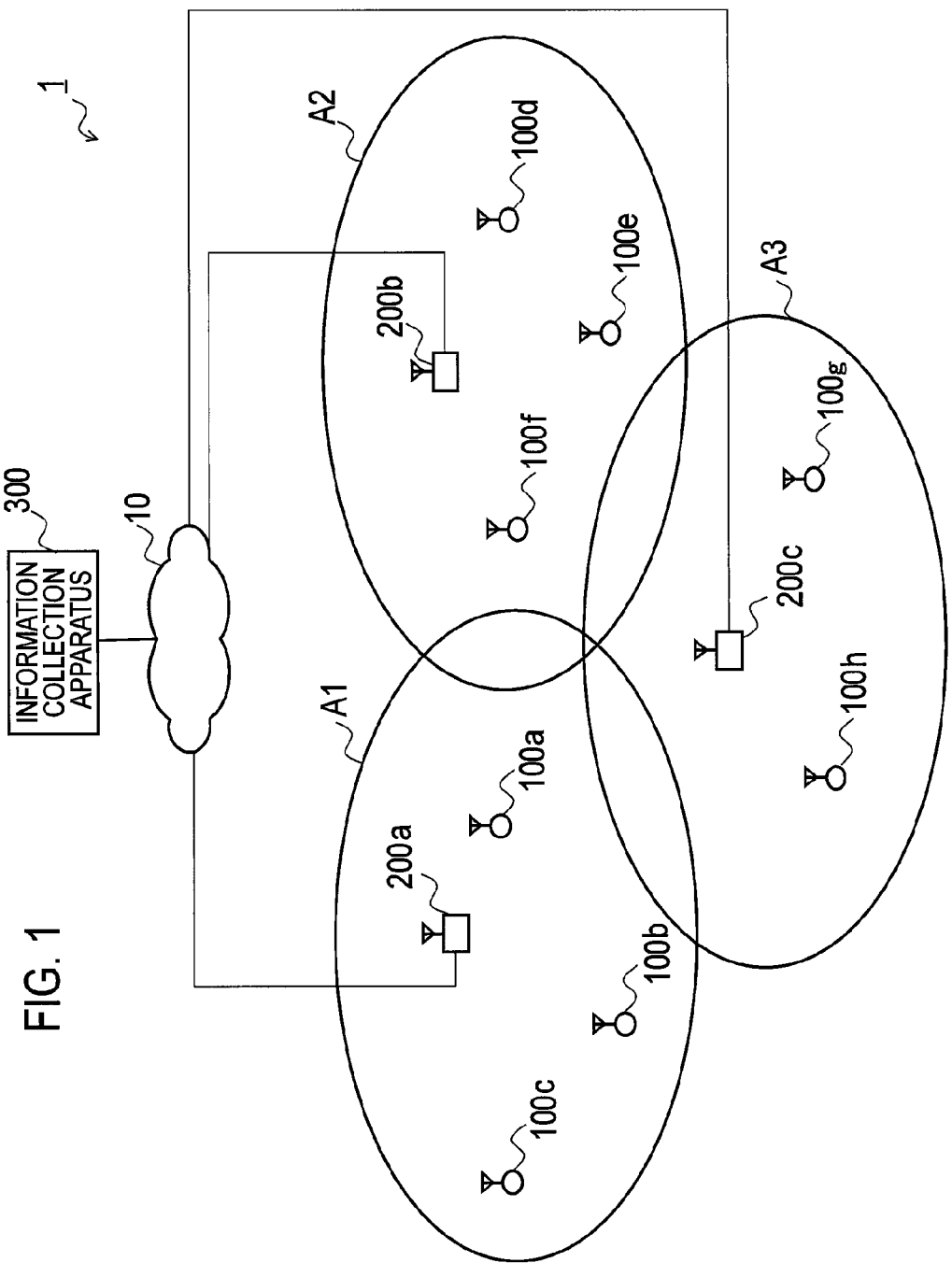
FIG. 1 is a schematic configuration diagram of a radio communication system according to an embodiment of the present invention.

FIG. 1 shows a schematic configuration diagram of a radio communication system 1 according to the embodiment. The radio communication system 1 includes a configuration based on LTE Release 9, which is a 3.9-generation (3.9G) mobile phone system, or a configuration based on LTE-Advanced, which is considered as a fourth generation (4G) mobile phone system.

As shown in FIG. 1, the radio communication system 1 includes radio terminals 100a to 100h, radio base stations 200a to 200c, and an information collection apparatus 300. Note that, the number of radio terminals and the number of radio base stations shown in FIG. 1 are shown for illustration purposes only. Thus, the radio communication system 1 actually includes a larger number of radio terminals and a larger number of radio base stations.

The radio communication system 1 achieves an area-wide coverage of a wide service area (target measurement area) by dividing the wide service area into communication area units called cells, in each of which a radio base station in charge of radio communications with radio terminals within the communication area is installed.

In the example in FIG. 1, the radio base stations 200a to 200c form communication areas A1 to A3, respectively. The radio terminals 100a to 100c are located in the communication area A1. The radio terminals 100a to 100c are each in a standby state for the radio base station 200a (idle state) or in a state of performing communications with a communication counterpart via the radio base station 200a (active state). The radio terminals 100d to 100f are located in the communication area A2. The radio terminals 100d to 100f are each in a standby state for the radio base station 200b or in a state of performing communications with a communication counterpart via the radio base station 200b. The radio terminals 100g and 100h are located in the communication area A3. The radio terminals 100g and 100h are each in a standby state for the radio base station 200c or in a state of performing communications with a communication counterpart via the radio base station 200c.

The radio base stations 200a to 200c are connected to a backhaul network 10, which is a wired communication network. The backhaul network 10 is provided by a telecommunications carrier and configured of a router or the like, an illustration of which is omitted.

The information collection apparatus 300 is connected to the backhaul network 10. The information collection apparatus 300 is capable of communicating with the radio base stations 200a to 200c via the backhaul network 10. The information collection apparatus 300 collects location information indicating the location of a radio terminal, and radio quality information indicating a measurement result of a radio quality at the location. In addition, the information collection apparatus 300 has a function as a management center for information about subscribers of the radio communication system 1.

(1.2) Detailed Configuration of Radio Communication System

Next, a description will be given of detailed configurations of the radio terminals 100a to 100h, the radio base stations 200a to 200c, and the information collection apparatus 300. The configuration of the radio terminal 100a will be described as a representative of the radio terminals 100a to 100h based on an assumption that the radio terminals 100a to 100h have the same configuration. The configuration of the radio base station 200a will be described as a representative of the radio base stations 200a to 200c based on an assumption that the radio base stations 200a to 200c have the same configuration.

(1.2.1) Configuration of Radio Terminal

FIG. 2 is a block diagram showing the configuration of the radio terminal 100a. As shown in FIG. 2, the radio terminal 100a includes a radio communication unit 110, a GPS (Global Positioning System) receiver 120, a controller 130, a storage unit 140, an operation receiver 150, a microphone 160, a speaker 170, a display unit 180, and a battery 190.

The radio communication unit 110 is configured using a radio frequency (RF) circuit, a baseband (BB) circuit, and the like, for example, and performs transmission and reception of radio signals to and from the radio base station 200a. In addition, the radio communication unit 110 performs coding and modulation of transmission signals and decoding and demodulation of reception signals. The GPS receiver 120 receives signals from a GPS satellite. The controller 130 is configured using a CPU, for example, and controls various functions included in the radio terminal 100a. The storage unit 140 is configured using a volatile memory and a nonvolatile memory, for example, and stores therein various types of information used in control and the like of the radio terminal 100a.

The operation receiver 150 is configured using a numerical keypad, function keys, or a touch panel or the like, and receives an operation from the user. The operation receiver 150 receives an operation (input or selection or the like of a phone number) for specifying a communication counterpart. In addition, the operation receiver 150 receives an operation for making an outgoing call to the specified communication counterpart (pressing of CALL key or ENTER key or the like).

The microphone 160 inputs a sound signal to the controller 130 on the basis of collected sound. The speaker 170 outputs sound on the basis of the sound signal from the controller 130. The display unit 180 is a display configured to output a character or image. The battery 190 stores power for supplying the power to the blocks of the radio terminal 100a.

The controller 130 includes a call processor 131, a location measurement unit 132, and a radio quality measurement unit 133.

The call processor 131 performs call processing in a case where the operation receiver 150 receives the operation for making an outgoing call. The call processing is processing to establish a call connection with the communication counterpart and is processing to establish a connection mainly with the radio base station 200a.

The location measurement unit 132 measures a geographical location of the radio terminal 100a from a signal received by the GPS receiver 120. The location to be measured includes longitude, latitude, and altitude, but it is also possible to measure only longitude and latitude.

The location information indicating the location measured by the location measurement unit 132 is transmitted from the radio communication unit 110 to the radio base station 200a. Here, the location information may be the values of longitude, latitude, and altitude or the like, or may be information for calculating these values.

The radio quality measurement unit 133 measures a downlink radio quality between the radio terminal 100a and the radio base station 200a. To put it specifically, the radio quality measurement unit 133 measures a radio quality of a radio signal (such as a reference signal) received by the radio communication unit 110 from the radio base station 200a when the call processor 131 makes an outgoing call. Here, received signal strength indicator (RSSI) or carrier to interference plus noise ratio (CINR) or the like corresponds to the radio quality. In the following description, an assumption is made that RSSI is used as the radio quality.

Information indicating the downlink radio quality measured by the radio quality measurement unit 133 (hereinafter, downlink radio quality information) is transmitted from the radio communication unit 110 to the radio base station 200a. Here, the downlink radio quality information may be the value of radio quality or the index of radio quality.

The location measurement unit 132 measures a geographical location of the radio terminal 100a when the radio quality measurement unit 133 measures the downlink radio quality. The location measurement unit 132 measures the location immediately before or immediately after the measurement of downlink radio quality, or simultaneously with the measurement thereof, for example. In the following description, a case where the location measurement unit 132 measures the location immediately after the measurement of downlink radio quality is illustrated as an example.

Note that, the location measurement unit 132 and the radio quality measurement unit 133 constitute a terminal side measurement unit configured to measure the location of the radio terminal and the downlink radio quality in this embodiment. Meanwhile, the radio communication unit 110 constitutes a terminal side transmitter configured to transmit the location information indicating the measured location and the downlink radio quality information indicating the measured downlink radio quality to the radio base station 200a.

In this embodiment, the nonvolatile memory that is a constituent component of the storage unit 140 previously stores therein an ID of the radio terminal 100a (hereinafter, terminal ID) and terminal performance information indicating a terminal performance which is the performance of the radio terminal 100a and which has influence on the measurement accuracy of radio quality. However, in a case where the ID of the radio terminal and the terminal performance information are previously stored in the information collection apparatus 300, the terminal performance information may not be previously stored in the storage unit 140.

Here, the terminal performance is at least one of the performance of the radio terminal 100a in measuring the radio quality and the performance of the radio terminal 100a in adjusting the transmission power. To put it specifically, the performance in measuring the radio quality is the measurement accuracy of radio quality and thus depends on the performance of the radio communication unit 110 and the performance of the controller 130. The performance in adjusting the transmission power is the adjustment accuracy of transmission power and thus depends on the performance of the radio communication unit 110 (mainly, power amplifier) and the performance of the controller 130.

The call processor 131 acquires the terminal ID from the storage unit 140 at the time of making an outgoing call. The radio communication unit 110 transmits a call connection request including the acquired terminal ID and the phone number of the communication counterpart to the radio base station 200a.

In addition, the call processor 131 acquires the terminal performance information from the storage unit 140 in accordance with the request from the radio base station 200a. The radio communication unit 110 transmits the acquired terminal performance information to the radio base station 200a.

(1.2.2) Configuration of Radio Base Station

FIG. 3 is a block diagram showing the configuration of the radio base station 200a. As shown in FIG. 3, the radio base station 200a includes a radio communication unit 210, a wired communication unit 220, a controller 230, and a storage unit 240.

The radio communication unit 210 is configured using an RF circuit, aBB circuit, and the like, for example, and performs transmission and reception of radio signals to and from the radio terminal 100a. The radio communication unit 210 performs coding and modulation of transmission signals and decoding and demodulation of reception signals.

In this embodiment, the radio communication unit 210 receives the call connection request including the terminal ID of the radio terminal 100a and the phone number of the communication counterpart from the radio terminal 100a. In addition, the radio communication unit 210 receives the location information and downlink radio quality information from the radio terminal 100a. The radio communication unit 210 constitutes a base station side receiver in this embodiment.

The wired communication unit 220 performs communications with the information collection apparatus 300 via the backhaul network 10. The controller 230 is configured using a CPU, for example, and controls various functions included in the radio base station 200a. The storage unit 240 is configured using a memory, for example, and stores therein various types of information used in control or the like of the radio base station 200a.

The controller 230 includes a query unit 231 and a radio quality measurement unit 232.

In a case where the radio communication unit 210 receives the call connection request, the query unit 231 acquires the terminal ID included in the call connection request and queries the information collection apparatus 300 by using the acquired terminal ID to find out whether or not the radio terminal 100a is a reference terminal. The term "reference terminal" means a target radio terminal whose location information and uplink and downlink radio quality information are to be collected. To put it specifically, neither location information nor uplink and downlink radio quality information is collected for a radio terminal other than the reference terminal.

The radio quality measurement unit 232 measures the uplink radio quality between the radio base station 200a and the radio terminal 100a. To put it specifically, the radio quality measurement unit 133 measures a radio quality of a radio signal (such as a reference signal) received by the radio communication unit 210 from the radio terminal 100a when the radio terminal 100a makes an outgoing call. Information indicating the uplink radio quality measured by the radio quality measurement unit 232 (hereinafter, uplink radio quality information) is transmitted from the wired communication unit 220 to the information collection apparatus 300. Here, the uplink radio quality information may be the value of radio quality or the index of radio quality.

In a case where the radio terminal 100a is the reference terminal, the wired communication unit 220 transmits the location information and downlink radio quality information received by the radio communication unit 210 from the radio terminal 100a and the uplink radio quality information acquired by the radio quality measurement unit 232 to the information collection apparatus 300 via the backhaul network 10. In this embodiment, the wired communication unit 220 constitutes a base station side transmitter.

(1.2.3) Configuration of Information Collection Apparatus

Figure 4:
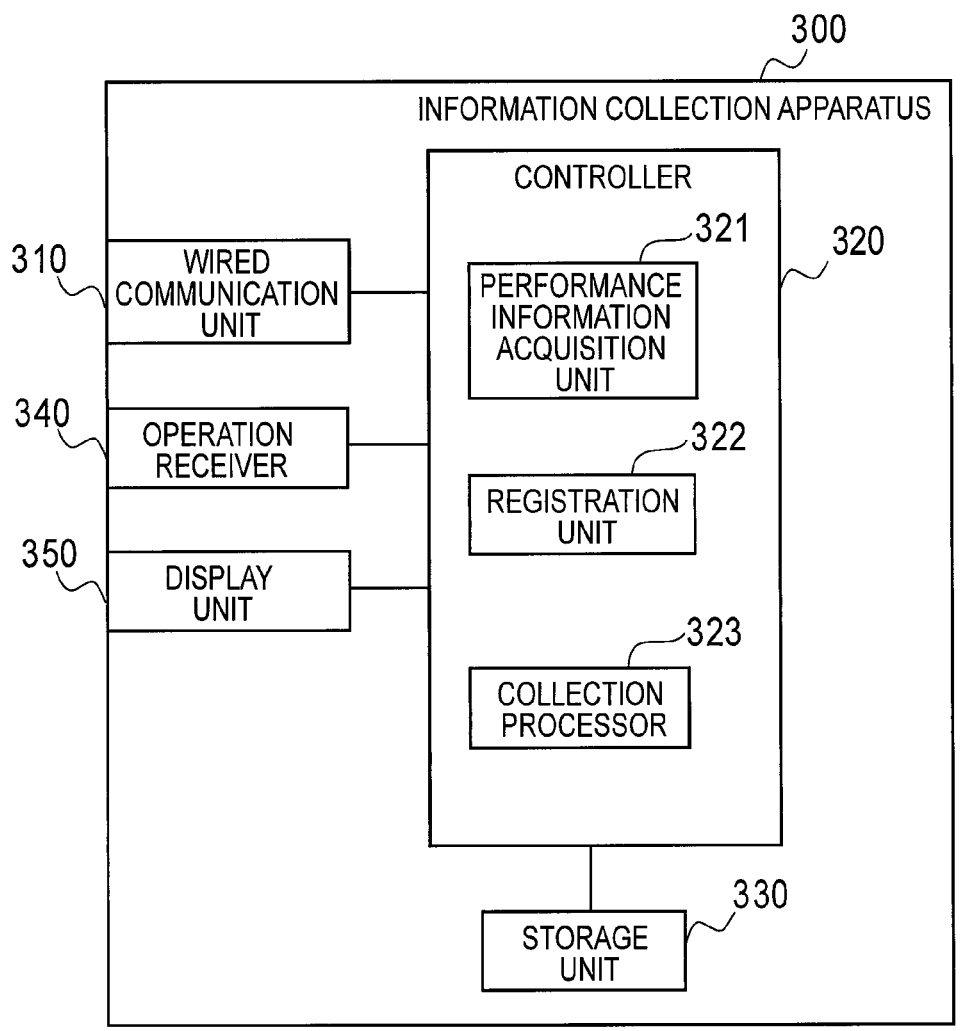
FIG. 4 is a block diagram showing a configuration of an information collection apparatus according to the embodiment of the present invention.

FIG. 4 is a block diagram showing the configuration of the information collection apparatus 300. As shown in FIG. 4, the information collection apparatus 300 includes a wired communication unit 310, a controller 320, a storage unit 330, an operation receiver 340, and a display unit 350.

The wired communication unit 310 performs communications with the radio base station 200a via the backhaul network 10. The wired communication unit 310 receives the query for the reference terminal from the radio base station 200a. The wired communication unit 310 receives the location information and uplink and downlink radio quality information from the radio base station 200a.

The controller 320 is configured using a CPU, for example, and controls various functions included in the information collection apparatus 300. The storage unit 330 is configured using a memory, for example, and stores therein various types of information used in control or the like of the information collection apparatus 300. The storage unit 330 stores therein the terminal ID of the radio terminal registered as the reference terminal.

In addition, the storage unit 330 may previously store therein, terminal performance information in association with a corresponding terminal ID. For example, terminal performance information is stored in the storage unit 330 at the time of shipping or purchase of a radio terminal.

The controller 320 includes a performance information acquisition unit 321, a registration unit 322, and a collection processor 323.

The performance information acquisition unit 321 acquires the terminal performance information from the storage unit 330 or acquires the terminal performance information from the radio terminal 100a via the radio base station 200a.

The registration unit 322 registers a radio terminal having a terminal performance equal to or greater than a required performance in the storage unit 330 on the basis of the terminal performance information acquired by the performance information acquisition unit 321. The term "required performance" means a degree of performance that makes the measurement accuracy of radio quality equal to or greater than a prescribed value. To put it specifically, in a case where the measurement accuracy of radio quality (RSSI in this embodiment) is equal to or greater than a prescribed value and/or a case where the accuracy of transmission power is equal to or greater than a prescribed value, the radio terminal is registered as the reference terminal.

The collection processor 323 performs processing to collect the location information and uplink and downlink radio quality information. The collection processor 323 collects the location information and uplink and downlink radio quality information on only the radio terminal registered by the registration unit 322 as the reference terminal. The location information and uplink and downlink radio quality information collected by the collection processor 323 are accumulated in the storage unit 330. The storage unit 330 functions as a data base in which the location information and uplink and downlink radio quality information are accumulated.

The registration unit 322 registers the reference terminal in the storage unit 330 and also registers the terminal performance information on the radio terminal to be registered as the reference terminal in the storage unit 330. For example, the terminal performance information is registered in the storage unit 330 in association with the terminal ID of the radio terminal to be registered as the reference terminal.

The collection processor 323 corrects or weights the collected radio quality information by using the registered terminal performance information. For example, in a case where multiple pieces of radio quality information exist for the same location, the collection processor 323 corrects the radio quality information measured by using a radio terminal having a relatively low terminal performance, by using the radio quality information measured by using a radio terminal having a relatively high terminal performance. Alternatively, the collection processor 323 increases the weight of the radio quality information measured by using a radio terminal having a relatively high terminal performance and decreases the weight of the radio quality information measured by using a radio terminal having a relatively low terminal performance. Such correction or weighting can further improve the accuracy of radio quality information.

The operation receiver 340 is configured using a keyboard and a mouse or the like, for example, and receives an operation from the operator. The operation includes a display operation to cause the display unit 350 to display the collected location information and uplink and downlink radio quality information. The display unit 350 displays the location information and uplink and downlink radio quality information when the operation receiver 340 receives the display operation. Accordingly, the operator can figure out a blind zone and a low electric field zone.

(2) Operation of Radio Communication System

Next, a description will be given of an operation of the radio communication system 1 in order of reference terminal registration processing and information collection processing.

(2.1) Reference Terminal Registration Processing

Figure 5:
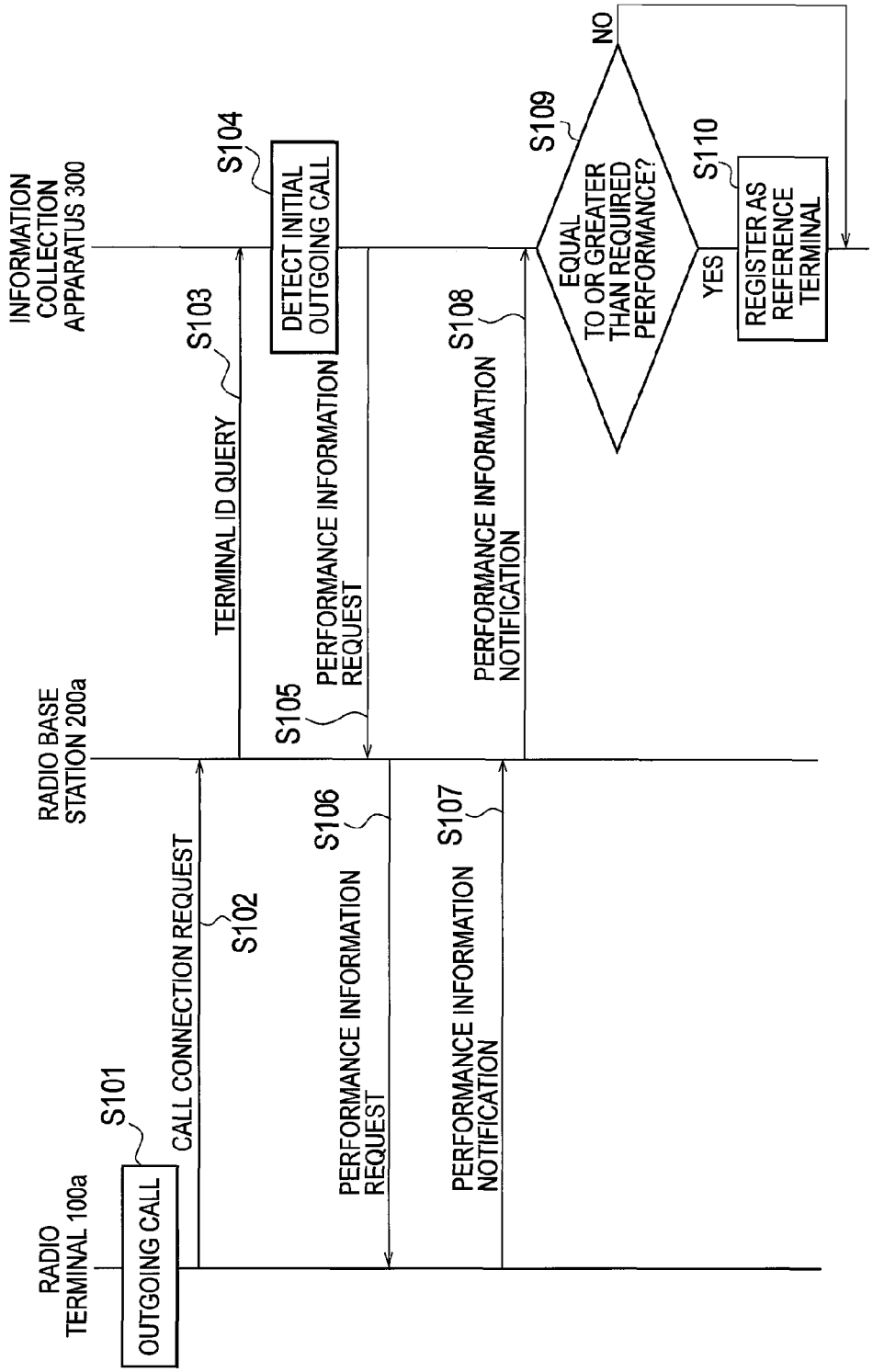
FIG. 5 is a flowchart showing reference terminal registration processing according to the embodiment of the present invention.

FIG. 5 is a flowchart showing the reference terminal registration processing. In this operation flow, a case where the terminal performance information is previously stored in the radio terminal 100a is illustrated as an example.

In step S101, the call processor 131 performs the call processing. Here, an assumption is made that this call is the initial outgoing call after purchase of the terminal.

In step S102, the radio communication unit 110 of the radio terminal 100a transmits a call connection request including the terminal ID of the radio terminal 100a and the phone number of the communication counterpart to the radio base station 200a. The radio communication unit 210 of the radio base station 200a receives the call connection request.

In step S103, the query unit 231 of the radio base station 200a sends a query to the information collection apparatus 300 by using the terminal ID included in the call connection request. The wired communication unit 310 of the information collection apparatus 300 receives the query from the radio base station 200a.

In step S104, the controller 320 of the information collection apparatus 300 detects that this call is the initial outgoing call with reference to the storage unit 330. Upon detecting that the call is the initial outgoing call, the performance information acquisition unit 321 transmits a request for terminal performance information to the radio base station 200a via the wired communication unit 310 in step S105. The wired communication unit 220 of the radio base station 200a receives the request for terminal performance information.

In step S106, the radio communication unit 210 of the radio base station 200a transmits the request for terminal performance information to the radio terminal 100a. The radio communication unit 110 of the radio terminal 100a receives the request for terminal performance information. Upon receipt of the request for terminal performance information, the controller 130 of the radio terminal 100a acquires the terminal performance information and the terminal ID from the storage unit 140.

In step S107, the radio communication unit 110 of the radio terminal 100a transmits a performance information notification including the terminal performance information and the terminal ID to the radio base station 200a. The radio communication unit 210 of the radio base station 200a receives the performance information notification.

In step S108, the wired communication unit 220 of the radio base station 200a transmits the performance information notification to the information collection apparatus 300. The wired communication unit 310 of the information collection apparatus 300 receives the performance information notification, and the performance information acquisition unit 321 acquires the terminal performance information and the terminal ID from the performance information notification.

In step S109, the registration unit 322 of the information collection apparatus 300 checks on the basis of the terminal performance information acquired by the performance information acquisition unit 321 whether or not the terminal performance is equal to or greater than a required performance. In a case where it is confirmed that the terminal performance is equal to or greater than the required performance (step S109; YES), the registration unit 322 attaches a reference terminal flag to the terminal ID acquired by the performance information acquisition unit 321 and then registers the terminal ID in the storage unit 330 in step S110.

(2.2) Information Collection Processing

Figure 6:
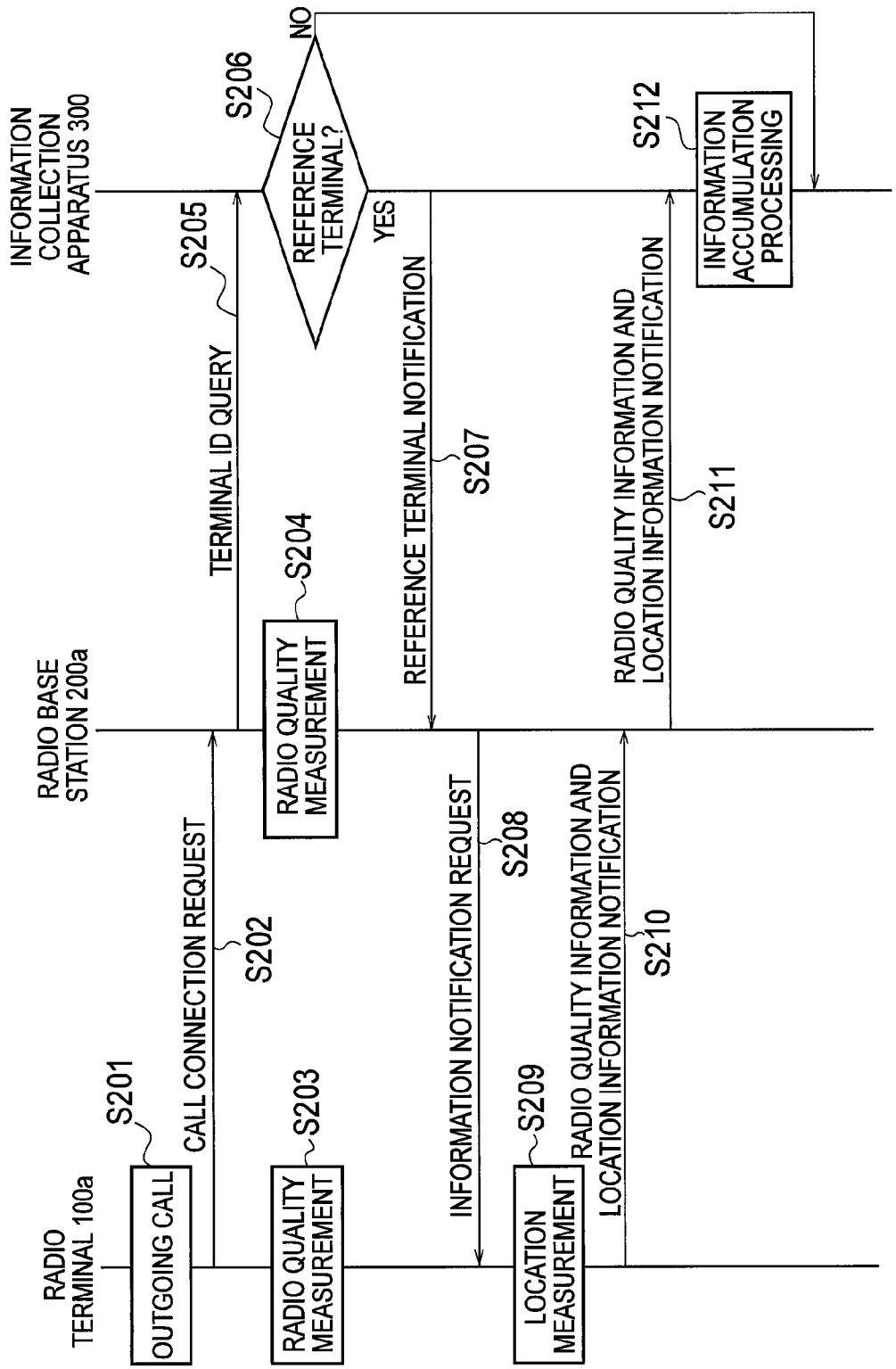
FIG. 6 is a flowchart showing information collection processing according to the embodiment of the present invention.

FIG. 6 is a flowchart showing the information collection processing.

In step S201, the call processor 131 of the radio terminal 100a performs the call processing. Here, an assumption is made that this outgoing call is the second or subsequent outgoing call.

In step S202, the radio communication unit 110 of the radio terminal 100a transmits a call connection request including the terminal ID of the radio terminal 100a and the phone number of the communication counterpart to the radio base station 200a. The radio communication unit 210 of the radio base station 200a receives the call connection request. Thereafter, call connection processing (so called, communication negotiation) between the radio terminal 100a and the radio base station 200a begins.

In step S203 during the call connection processing, the radio quality measurement unit 133 of the radio terminal 100a measures the downlink radio quality. Likewise, in step S204 during the call connection processing, the radio quality measurement unit 232 of the radio base station 200a measures the uplink radio quality.

In step S205, the query unit 231 of the radio base station 200a sends a query to the information collection apparatus 300 by using the terminal ID included in the call connection request. The wired communication unit 310 of the information collection apparatus 300 receives the query from the radio base station 200a.

After it is confirmed that this call is not the initial outgoing call, the collection processor 323 of the information collection apparatus 300 checks whether or not the terminal ID included in the query is registered as the reference terminal in step S206. In a case where it is confirmed that the terminal ID is registered as the reference terminal (step S206; YES), the collection processor 323 transmits a reference terminal notification for notifying the radio base station 200a that the query target radio terminal is a reference terminal to the radio base station 200a from the wired communication unit 310 in step S207. The wired communication unit 220 of the radio base station 200a receives the reference terminal notification.

Upon receipt of the reference terminal notification, the radio communication unit 210 of the radio base station 200a transmits a request for location information and downlink radio quality information to the radio terminal 100a in step S208. The radio communication unit 110 of the radio terminal 100a receives the request.

Upon receipt of the request, the location measurement unit 132 of the radio terminal 100a measures the location of the radio terminal 100a in step S209.

In step S210, the radio communication unit 110 of the radio terminal 100a transmits a notification for the location information and downlink radio quality information to the radio base station 200a. The radio communication unit 210 of the radio base station 200a receives the notification.

In step S211, the wired communication unit 220 of the radio base station 200a transmits a notification including the location information and downlink radio quality information received from the radio base station 200a and the uplink radio quality information acquired by the radio quality measurement unit 232 to the information collection apparatus 300. The wired communication unit 310 of the information collection apparatus 300 receives the notification.

In step S212, the collection processor 323 of the information collection apparatus 300 corrects or weights the location information and uplink and downlink radio quality information included in the notification received from the radio base station 200a and then causes the storage unit 330 to store the location information and uplink and downlink radio quality information.

As described above, the radio terminal 110a measures the downlink radio quality during call connection processing executed along with an outgoing call. The radio base station 200a measures the uplink radio quality during the call connection processing executed along with an outgoing call.

(3) Effects of Embodiment

As described above, each of the downlink and uplink radio qualities is measured at the time of making an outgoing call (during the call connection processing, to be specific). Thus, it is made possible to avoid measuring the radio quality under a situation where the radio terminal is stowed in a bag and also to guarantee that the radio quality is measured under ideal measurement conditions. Moreover, even in a case where both of a radio terminal having a high terminal performance and a radio terminal having a low terminal performance exist, the measurement accuracy of radio quality is guaranteed by collecting the radio quality information on only a radio terminal having a terminal performance equal to or greater than a required performance. Thus, accurate radio quality information can be collected.

(4) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, the radio communication system 1 based on LTE Release 9 or LTE-Advanced is described in the above embodiment. However, the present invention can be applied to another radio communication system such as a radio communication system based on the WiMAX standard (IEEE 802.16).

As described above, the present invention naturally includes various embodiments which are not described herein. Accordingly, the technical scope of the present invention should be determined only by the matters to define the invention in the scope of claims regarded as appropriate based on the description.

The entire contents of Japanese Patent Application No. 2009-262380 (filed on Nov. 17, 2009) are herein incorporated by reference.

Industrial Applicability

As described above, each of the radio communication system, the radio terminal, the radio base station, and the information collection method according to the present invention enables collection of accurate radio quality information even in a case where end user radio terminals are used and thus is useful in radio communications such as mobile communications.

The invention claimed is:

1. A radio communication system comprising:
a mobile phone;
a radio base station configured to perform radio communications with the mobile phone; and
an information collection apparatus configured to collect location information indicating a location of the mobile phone, downlink radio quality information indicating a measurement result of a downlink radio quality between the mobile phone and the radio base station, and uplink radio quality information indicating a measurement result of an uplink radio quality between the mobile phone and the radio base station, wherein
the mobile phone measures the downlink radio quality during call connection processing executed along with an outgoing call made by the mobile phone,
the radio base station measures the uplink radio quality during the call connection processing executed along with the outgoing call,
the call connection processing is processing to establish a connection between the mobile phone and the radio base station, and
the information collection apparatus is configured to check whether or not the mobile phone has been registered as a reference terminal and to collect the location information, the downlink radio quality information, and the uplink radio quality information when the information collection apparatus has registered the mobile phone as a reference terminal.

2. A mobile phone configured to perform radio communications with a radio base station in a radio communication system that includes an information collection apparatus configured to check whether or not the radio terminal has been registered as a reference terminal and collect location information, downlink radio quality information, and uplink radio quality information of the mobile phone when the information collection apparatus has registered the mobile phone as a reference terminal, the mobile phone comprising:
a call processor configured to make an outgoing call;
a mobile phone side measurement unit configured to measure a downlink radio quality between the mobile phone and the radio base station, and a location of the mobile phone; and
a mobile phone side transmitter configured to transmit location information indicating the measured location, and downlink radio quality information indicating the measured downlink radio quality to the radio base station, wherein
the mobile phone side measurement unit measures the downlink radio quality during call connection processing executed along with the outgoing call, and
the call connection processing is processing to establish a connection between the mobile phone and the radio base station.

3. A radio base station configured to perform radio communications with a mobile phone, comprising:
a base station side measurement unit configured to measure an uplink radio quality between the radio base station and the mobile phone;
a base station side receiver configured to receive, from the mobile phone, location information indicating a location of the mobile phone, and downlink radio quality information indicating a downlink radio quality measured by the mobile phone; and
a base station side transmitter configured to transmit uplink radio quality information indicating the uplink radio quality measured by the base station side measurement unit, the location information, and the downlink radio quality information to an information collection apparatus, said information collection apparatus configured to check whether or not the mobile phone has been registered as a reference terminal and to collect the location information, the downlink radio quality information, and the uplink radio quality information when the information collection apparatus has registered the mobile phone as a reference terminal, wherein
the base station side measurement unit measures the uplink radio quality during call connection processing executed along with an outgoing call made by the mobile phone, and
the call connection processing is processing to establish a connection between the mobile phone and the radio base station.

4. An information collection method comprising:

making an outgoing call by a mobile phone;

measuring a downlink radio quality between the mobile phone and a radio base station by the mobile phone during call connection processing executed along with the outgoing call;

measuring an uplink radio quality between the radio base station and the mobile phone by the radio base station during call connection processing executed along with the outgoing call; and collecting by an information collection apparatus, location information indicating a location of the mobile phone, downlink radio quality information indicating a measurement result of the downlink radio quality, and uplink radio quality information indicating a measurement result of the uplink radio quality, wherein the call connection processing is processing to establish a connection between the mobile phone and the radio base station, and the information collection apparatus is configured to check whether or not the mobile phone has been registered as a reference terminal and to collect the location information, the downlink radio quality information, and the uplink radio quality information when the information collection apparatus has registered the mobile phone as a reference terminal.

* * * * *